United States Patent [19]

Magazzu

[11] 4,125,671
[45] Nov. 14, 1978

[54] ACRYLATED DITHIOCARBAMYL ESTERS

[75] Inventor: Joseph J. Magazzu, Levittown, Pa.

[73] Assignee: Thiokol Corporation, Newtown, Pa.

[21] Appl. No.: 794,495

[22] Filed: May 6, 1977

[51] Int. Cl.$^2$ .................. B32B 27/06; B32B 27/40
[52] U.S. Cl. .................. 428/419; 96/115 R;
204/159.15; 204/159.19; 204/159.18; 260/30.8
R; 260/455 A; 427/44; 427/54; 428/425;
526/288
[58] Field of Search .................. 428/419, 425;
204/159.15, 159.18, 159.19; 260/30.8 R, 79,
77.5 A, 858, 453 R, 609 R, 455 A; 96/115 R;
427/44, 54

[56] References Cited

U.S. PATENT DOCUMENTS

| 3,429,795 | 2/1969 | Delzenne et al. | 204/159.15 |
| 3,523,925 | 8/1970 | Kamal et al. | 260/77.5 A |
| 3,652,504 | 3/1972 | Sayigh et al. | 428/425 |
| 3,782,961 | 1/1974 | Takahashi et al. | 204/159.15 |

Primary Examiner—Douglas J. Drummond
Assistant Examiner—J. J. Gallagher

Attorney, Agent, or Firm—Stanley A. Marcus; Royal E. Bright

[57] ABSTRACT

Acrylated dithiocarbamyl esters of Formula I

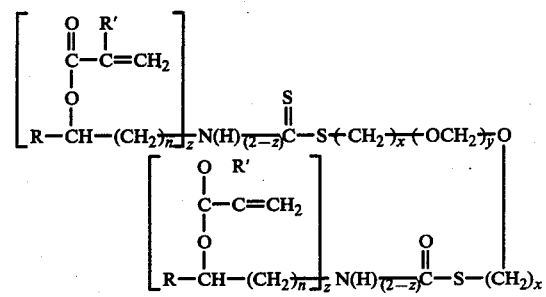

wherein R is hydrogen, or alkyl of 1 to about 10 carbon atoms; R' is hydrogen, or methyl; $x$ is an integer of from 2 to about 10; $y$ is 0 or an integer of from 1 to 3; $z$ is 1 or 2; and $n$ is an integer of from 1 to about 10 are disclosed. The compounds are useful as reactive diluents or photocurable prepolymers.

15 Claims, No Drawings

ACRYLATED DITHIOCARBAMYL ESTERS

BACKGROUND OF THE INVENTION

This invention relates to radiation curable prepolymers, reactive diluents for incorporation in formulations containing said prepolymers, cured products prepared therefrom, and processes relating to the preparation and use of said reactive diluents and of the formulations containing them.

Radiation cured polymeric systems containing occasional sulfur linkages are known and are desirable because of the fact that they are normally tough, flexible films. The majority of these systems have been based upon a curing reaction between a thiol function and a vinylic double bond function in the precursor molecules, the so-called "thiol-ene" reaction.

The use of reactive diluents containing preformed thiocarbamate linkages to increase the toughness and flexibility of radiation cured polyurethane films while improving the processing characteristics of uncured formulations containing them has not been reported. Indeed, the known sensitivity of many types of carbon-sulfur linkages to ultraviolet light makes the usefulness of the compounds of this invention as reactive diluents for radiation curable polymers even more surprising.

SUMMARY OF THE INVENTION

The invention provides a compound of the Formula I

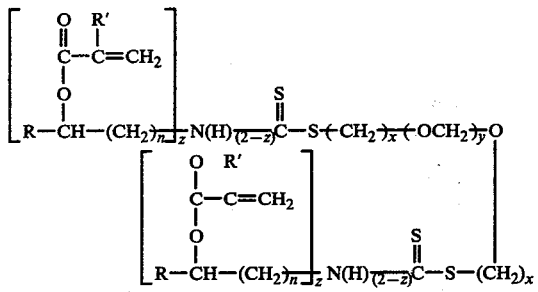

wherein R is hydrogen, or alkyl of 1 to about 10 carbon atoms; R' is hydrogen, or methyl; $x$ is an integer of from 2 to about 10; $y$ is 0 or an integer of from 1 to 3; $z$ is 1 or 2; and $n$ is an integer of from 1 to about 10.

The tangible embodiments of this composition aspect of the invention possess the inherent applied use characteristic of being reactive diluents for radiation curable prepolymer formulations. Said diluents reduce the viscosity of formulations containing them, thereby enabling greater ease in obtaining uniform application to a substrate. Cured films prepared from formulations containing the tangible embodiments of this composition aspect of the invention are more flexible and extensible than films prepared from similar formulations lacking said tangible embodiments.

Preferred embodiments of this composition aspect of the invention are those wherein $y$ is 1. Also preferred are those embodiments wherein $x$ is 2, $n$ is 1 and R is hydrogen, or methyl and those wherein $x$ is 2, $n$ is 2 and R is hydrogen.

The invention also provides a radiation curable composition which comprises a liquid radiation curable polyurethane prepolymer, and a compound of Formula I.

The tangible embodiments of this composition aspect of the invention possess the inherent applied use characteristic of being curable when subjected to energy derived from actinic or electron beam radiation to form tough, flexible, extensible films suitable for coating wood, metal, leather, and paper and as curable vehicles for printing inks, pigmented coatings and the like.

The invention also provides a cured film comprising the reaction products of a liquid radiation curable polyurethane prepolymer and a compound of Formula I.

The invention also provides an article of manufacture which comprises a substrate coated on at least one surface with a cured film derived from a curable coating comprising a liquid radiation curable polyurethane prepolymer and a compound of Formula I.

The invention also provides an improved radiation curable composition comprising a liquid radiation curable polyurethane prepolymer and a reactive diluent wherein the improvement consists of the reactive diluent comprising a compound of Formula I.

The invention also provides an improved radiation curable composition based upon a liquid radiation curable polyurethane prepolymer wherein the improvement comprises the addition to a conventional radiation curable composition based upon said polyurethane prepolymer of a compound of Formula I.

DESCRIPTION OF THE PREFERRED EMBODIMENT

The manner of making and using the compositions of the invention will now be described with reference to a specific embodiment thereof, namely bis-(2-hydroxy ethyl) dithiocarbamyl ethyl formal tetraacrylate (II).

The starting material for the preparation of II, bis-(2-hydroxy ethyl) dithiocarbamyl ethyl formal (III) may be prepared by techniques well-known in the art. Diethanolamine may be treated with carbon disulfide in the presence of sodium hydroxide in aqueous solution at temperatures ranging from room temperature to the reflux temperature of the carbon disulfide and then the sodium dithiocarbamate salt so formed may be treated with bis-(2-chloroethyl) formal in the same aqueous solution. The temperature of the latter reaction will also range from about room temperature to slightly less than the reflux temperature of the reaction mixture. If desired, the III so formed may be isolated by standard techniques, conveniently by separating the product, which will be a second oily phase in the reaction mixture, from the residual aqueous solution, washing to neutrality with fresh water and drying to constant weight. III may be treated with ethyl acrylate, conveniently a large excess of ethyl acrylate which will serve as a solvent, in the presence of standard polymerization inhibitors and a standard transesterification catalyst, conveniently an organic titanate salt. The reaction may also be performed in any inert solvent which will not interfere with the course of the reaction. The reaction is conveniently performed at temperatures above room temperature, conveniently about 100° C., or the reflux temperature of the solvent employed, if it is not substantially different from 100° C. The II so formed is conveniently recovered, if desired, by removal of excess solvent followed by distillation of the residual reaction contents from the reaction flask.

In addition to the ethyl acrylate illustrated for the preparation of II, one skilled in the art will recognize that any acrylate or methacrylate ester may be substituted in the reaction to prepare the various acrylate or methacrylate derivatives contemplated within the scope of Formula I. One skilled in the art will also recognize that in addition to the diethanolamine illustrated one may substitute in the reaction any convenient mono or dialkanolamine and prepare the various other dithiocarbamates analogous to II which will lead to the various derivatives of Formula I. It will similarly be obvious that for the bis-(2-chloroethyl) formal illustrated one may substitute other bis-(ω-haloalkyl) formal derivatives to get the other analogs of II which will lead to other compounds of Formula I wherein $y$ is 1, and one may substitute the corresponding ω, ω′=dihalodialkyl ehters to ultimately obtain the corresponding compounds of Formula I wherein $y$ is 0. Compounds with $y$ greater than 1 may be prepared from compounds of the formula

$$Cl-(CH_2)_x-(OCH_2)_y-O-(CH_2)_x-Cl \qquad (IV)$$

wherein $x$ is as defined hereinabove and $y$ is 2 or 3 in analogous procedures to those described above for compounds wherein $y$ is 0 or 1. These compounds (IV) may be prepared by condensing α,ω-haloalkyl compounds with formaldehyde in the presence of an acid catalyst as for the well-known preparation of analogous compounds wherein $y$ is 1, but doubling or tripling the proportion of formaldehyde for $y=2$ and $y=3$ respectively, and controlling the temperature to the minimum needed for water removal.

In using the compositions of the invention, it is contemplated that the compounds of Formula I will be employed as reactive diluents in standard ultraviolet or electron beam curable formulations employing known acrylate terminated polyurethane prepolymer as the liquid radiation curable polyurethane prepolymer. For example, II may be added to an acrylate terminated polyurethane prepolymer such as an acrylate terminated polyester and, if desired, a photosensitizer such as benzophenone and the like, then spread as a film on the substrate which it is desired to coat and exposed to either ultraviolet light or an electron beam thereby being cured.

It will, of course, be obvious to one skilled in the art that in addition to II any of the other compounds of Formula I contemplated within the scope of the invention may also be incorporated in similar formulations and cured in similar fashion.

Optionally one may also incorporate other viscosity control agents, pigments and even other reactive diluents depending on the particular properties desired and the particular applications for which the completed formulations are desired.

Intermediates of structure II are also disclosed in copending application Ser. No. 766,660, filed Feb. 8, 1977.

The following Examples further illustrate the best mode contemplated by the inventor for the practice of his invention.

EXAMPLE 1

Bis-[2-(di-2-hydroxy propyl dithiocarbamyl) ethyl] formal

To sodium hydroxide (40 g) dissolved in 120 milliliters of water is added diisopropanolamine (119 g). To this mixture while stirring at room temperature is added carbon disulfide (76 g). After addition of carbon disulfide is complete, the temperature is raised to 60° C. and bis-dichloroethyl-formal (90 g) is added while stirring. Following addition of formal, the reaction mixture is warmed to reflux temperature for about 3 hours. After cooling an oily layer separates from the reaction mixture and is partitioned from the water layer. The oily layer is washed with small portions of water to pH7 and absence of silver nitrate chloride test. The material is then dried to constant weight at 75° to 80° C. and 1 to 2 millimeters of mercury to give the title product (193 g).

EXAMPLE 2

Bis-[2-(di-2-hydroxy ethyl dithiocarbamyl) ethyl] formal

Following a procedure analogous to that of Example 1, there is obtained from diethanolamine, sodium hydroxide, carbon disulfide and bis-(2 chloroethyl) formal, the title product.

EXAMPLE 3

Bis-(2-hydroxyethyl) dithiocarbamyl ethyl formal tetraacrylate

Bis-(2-hydroxyethyl) dithiocarbamyl ethyl formal (230 grams) and ethyl acrylate (404 grams), nitrobenzene (0.2 grams), phenothiazine (0.3 grams) were refluxed to remove any possible moisture while stirring, and the mixture is then cooled and Tyzor TPT (Triisopropyl Titanate) was added. The reaction mixture was then heated and stirred to reflux temperature while sampling 100 milliliter aliquots of the ethyl acrylate-ethanol condensate from the reflux head. When no more material was distillable up to 125° C. pot temperature at either atmospheric pressure or 2½ millimeter mercury vacuum the reaction mixture was cooled, and filtered, the filtrate being the title product (339 grams).

EXAMPLE 4

Ultraviolet light curable formulations were prepared from the ingredients listed in the proportions shown:

| Material Formulation No: | Quantities (g) | | | |
|---|---|---|---|---|
| | 1 | 2 | 3 | 4 |
| Bis-(2 hydroxy ethyl dithiocarbamyl) ethyl formal tetraacrylate | 10 | 10 | 10 | 10 |
| Acrylate terminated polyurethane polyester* | 25 | 25 | 25 | 25 |
| Vinyl pyrrolidone | 15 | 15 | 15 | 15 |
| Benzophenone | 1.5 | | | |
| Vicure 10** | | 1.5 | | |
| Vicure 30*** | | | 1.5 | |
| α,α-diethoxy-acetophenone | | | | 1.5 |

*Poly(ethylene adipate) average Eq. Wt. about 300 terminated with toluene diisocyanate at 2/1 NCO to OH ratio then with hydroxy ethyl acrylate at 1.05/1 OH to NCO ratio.
**Vicure 10 is a liquid benzyl ether photosensitizer from Stauffer Chemical Co.
***Vicure 30 is the powdered equivalent of Vicure 10.

The above formulations were brush coated on silicone release paper and exposed to U.V. light at 20 feet per minute using a QC 1202 AN Processor (PPG Industries Inc., Radiation Polymer Co.) under two 12 inch lamps having a linear power density of 200 watts per inch. Formula I gave a soft cure, Formula 2, 3 and 4 gave a firm cure with no cotton effect on surface.

The subject matter which applicant regards as his invention is particularly pointed out and distinctly claimed as follows:

1. An article of manufacture which comprises a substrate coated on at least one surface thereof with a cured film derived from a radiation curable polyurethane prepolymer and a compound of the Formula:

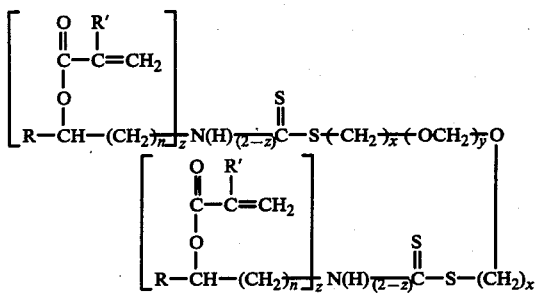

wherein R is hydrogen, or lower alkyl of 1 to about 10 carbon atoms; R' is hydrogen or methyl; $x$ is an integer of from 2 to about 10; $y$ is 0 or 1; $z$ is 1 or 2; and $n$ is an integer of from 1 to about 10.

2. A compound of the formula:

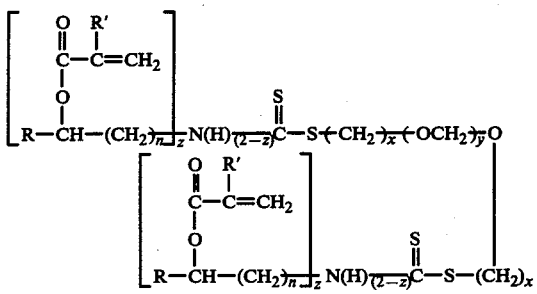

wherein R is hydrogen, or lower alkyl of 1 to about 10 carbon atoms; R' is hydrogen or methyl; $x$ is an integer of from 2 to about 10; $y$ is 0 or 1; $z$ is 1 or 2; and $n$ is an integer of from 1 to 10.

3. A compound as defined in claim 1 wherein $y$ is 1.
4. A compound as defined in claim 1 wherein $x$ is 2.
5. A compound as defined in claim 3 wherein $x$ is 2.
6. A compound as defined in claim 1 wherein R is methyl and $n$ is 1.
7. A compound as defined in claim 3 wherein R is methyl and $n$ is 1.
8. A compound as defined in claim 1 wherein R is hydrogen and $n$ is 1.
9. A compound as defined in claim 3 wherein R is hydrogen and $n$ is 1.
10. A compound as defined in claim 9 wherein $x$ is 2.
11. A compound as defined in claim 1 wherein $z$ is 2.
12. A compound as defined in claim 9 wherein $z$ is 2.
13. A compound as defined in claim 10 wherein $z$ is 2.
14. A radiation curable composition which comprises a radiation curable polyurethane prepolymer and a compound of Formula:

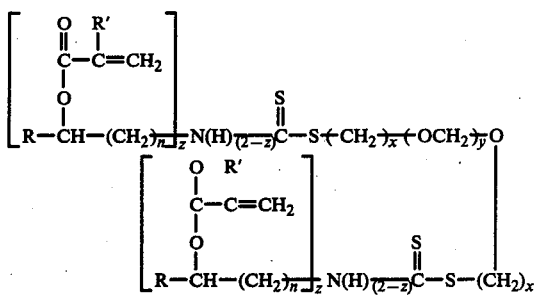

wherein R is hydrogen, or lower alkyl of 1 to about 10 carbon atoms; R' is hydrogen or methyl; $x$ is an integer of from 2 to about 10; $y$ is 0 or 1; $z$ is 1 or 2; and $n$ is an integer of from 1 to about 10.

15. A cured film comprising the reaction products of a radiation curable polyurethane prepolymer and a compound of the Formula:

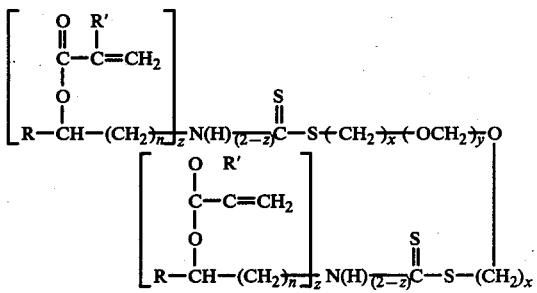

wherein R is hydrogen, or lower alkyl of 1 to about 10 carbon atoms; R' is hydrogen or methyl; $x$ is an integer of from 2 to about 10; $y$ is 0 or 1; $z$ is 1 or 2; and $n$ is an integer of from 1 to about 10.

* * * * *

UNITED STATES PATENT OFFICE
CERTIFICATE OF CORRECTION

Patent No. 4,125,671          Dated November 14, 1978

Inventor(s) Joseph J. Magazzu

It is certified that error appears in the above-identified patent and that said Letters Patent are hereby corrected as shown below:

In column 1 about line 39; claim 14 about line 17; and claim 15 about line 38, that portion of the Formula which now reads:

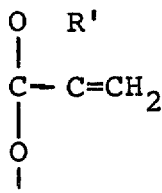

should read:

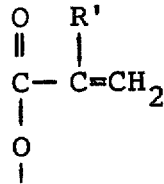

Signed and Sealed this

Twenty-ninth Day of May 1979

[SEAL]

Attest:

RUTH C. MASON
*Attesting Officer*

DONALD W. BANNER
*Commissioner of Patents and Trademarks*